(12) United States Patent
Hakansson et al.

(10) Patent No.: US 6,681,674 B2
(45) Date of Patent: Jan. 27, 2004

(54) BAND SAW BLADE

(76) Inventors: William Hakansson, Ekgatan 8, SE-662 36 Amal (SE); Bengt Emanuel Hakansson, Edsgatan 17, SE-662 30 Amal (SE)

( * ) Notice: Subject to any disclaimer, the term of this patent is extended or adjusted under 35 U.S.C. 154(b) by 0 days.

(21) Appl. No.: 10/076,699

(22) Filed: Feb. 13, 2002

(65) Prior Publication Data
US 2002/0124708 A1 Sep. 12, 2002

Related U.S. Application Data
(60) Provisional application No. 60/270,812, filed on Feb. 23, 2001.

(51) Int. Cl.[7] ............... B26D 1/46; B23D 53/00; B27B 33/02
(52) U.S. Cl. ............... 83/661; 83/788; 83/835; 83/846; 83/853
(58) Field of Search ............... 83/835, 846, 853, 83/788, 661

(56) References Cited

U.S. PATENT DOCUMENTS

| 1,354,439 | A | * | 9/1920 | McCormick | 83/661 |
| 1,649,864 | A | | 11/1927 | Sherman | |
| 2,757,697 | A | * | 8/1956 | Simmons et al. | 83/661 |
| 4,688,458 | A | * | 8/1987 | Krilov | 83/661 |
| 5,018,421 | A | * | 5/1991 | Lucki et al. | 83/835 |
| 5,775,181 | A | * | 7/1998 | Carlsen et al. | 76/112 |
| 5,884,547 | A | * | 3/1999 | Carlsen et al. | 83/835 |

FOREIGN PATENT DOCUMENTS

| WO | PCT/FI94/00189 | 5/1994 |
| WO | PCT/US95/10266 | 8/1995 |

* cited by examiner

Primary Examiner—Allan N. Shoap
Assistant Examiner—Isaac N Hamilton
(74) Attorney, Agent, or Firm—Rolf Fasth; Fasth Law Offices

(57) ABSTRACT

A saw blade with teeth has a tooth point with a tooth edge (E1, E2). A tooth face is on the front side of the tooth and a tooth back is behind the tooth edge. A tooth gullet (G1, G2) is defined as the space between the tooth edges of two adjacent teeth. The tooth edge (E1, E2) extends between a right hand tooth corner (A1, A2) and a left-hand tooth corner (B1, B2). A first tooth gullet, disposed between the tooth edge (E1) of a first tooth (T1) and the tooth edge (E2) of the next tooth (T2) is beveled. A sloping surface (S1) extends from the first tooth edge (E1) in the rear end of the first tooth gullet downwardly along the tooth face and to at least the tooth bottom.

11 Claims, 4 Drawing Sheets

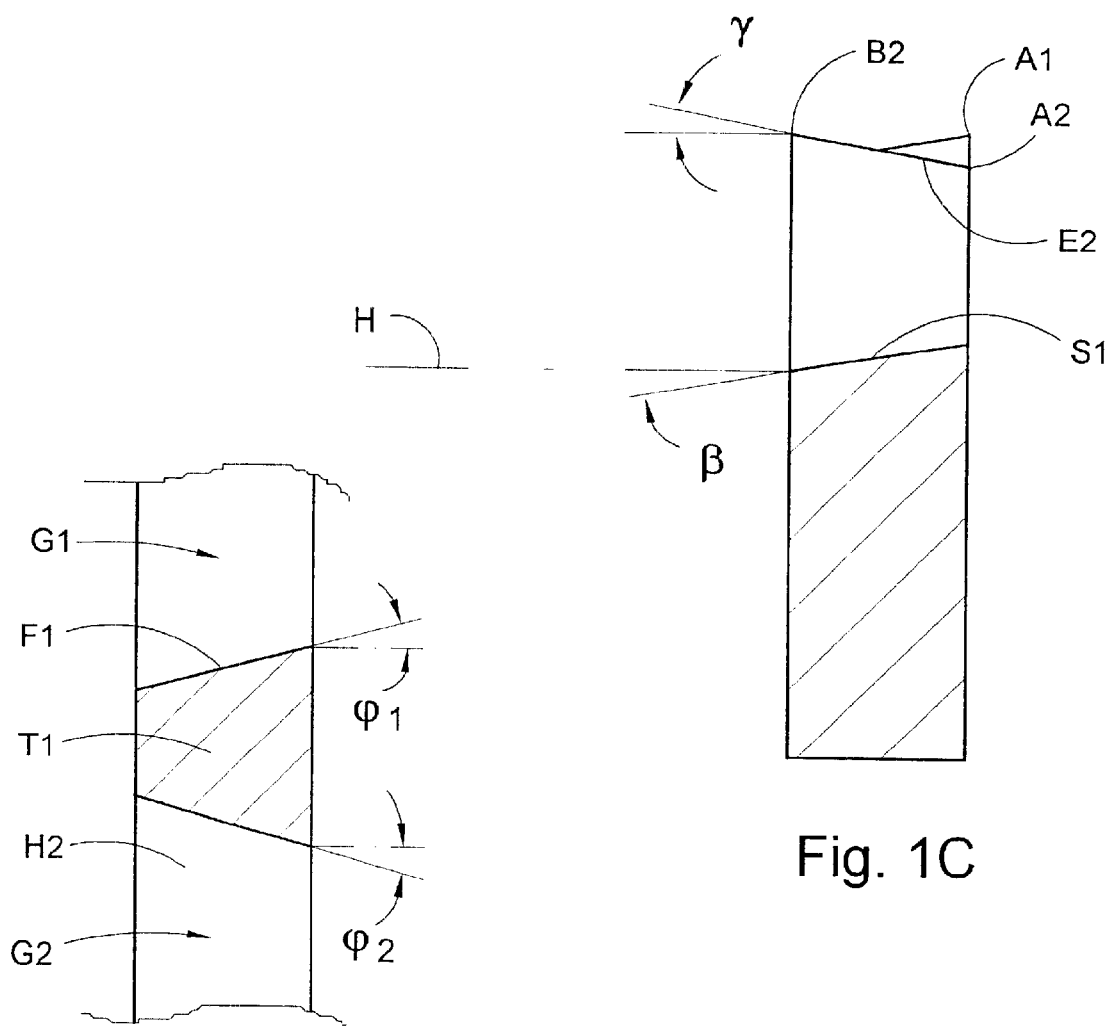
Fig. 1C
Fig. 1D
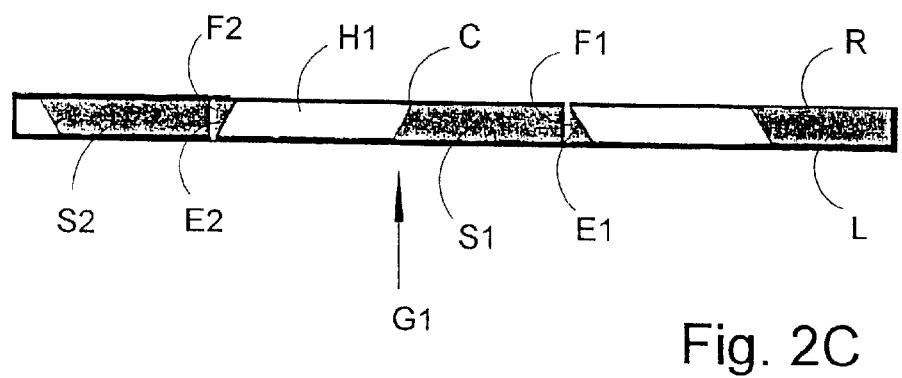
Fig. 2C

BAND SAW BLADE

This application claims benefit of Provisional application No. 60/270,812 filed Feb. 23, 2001.

TECHNICAL FIELD

The invention concerns a band saw blade with teeth having a tooth point with a tooth edge, a tooth face on the front side of the tooth as viewed in the direction of sawing, a tooth back behind the tooth edge, and a tooth bottom between the tooth face on each tooth and the tooth back on the next tooth in front of said each tooth, and tooth gullets, wherein a tooth gullet is defined as the space between the tooth edges of two adjacent teeth, said saw blade having two planar sides; a right hand side and a left hand side when the saw blade is viewed obliquely from above in the direction of sawing, wherein said tooth edge extends between a right hand tooth corner and a left hand tooth corner with reference to said viewing direction.

BACKGROUND OF THE INVENTION

Saw teeth of band saw blade work as tiny planing tools generating chips at high speed by planing and/or tearing, the chips being collected and removed in the tooth gullets. The development of increasingly efficient band saws has aimed at further developing this planing and/or tearing function of band saw blades. It is a typical feature of band saw blades that the teeth are set or swaged, so that the kerf will be somewhat wider than the blade is thick. The kerf is formed due to their milling away material.

It is also typical for band saw blades that they vibrate and give rise to noise at a volume which in many cases can be uncomfortably high. Further, the surfaces of the kerfs will be grooved or otherwise uneven, which requires considerable finishing in those cases when smooth surfaces are desired. Among other drawbacks can be mentioned that setting and swaging cause wide kerfs and hence substantial losses of material.

BRIEF DISCLOSURE OF THE INVENTION

It is the purpose of the invention to provide a band saw blade which saws very silently, which does not give rise to inconvenient vibrations, which gives surfaces having a good smoothness and thin, material-saving kerfs when sawing in e.g. wood, plastic, meat and metal.

Surprisingly, these effects can be achieved with a saw blade according to the invention. A band saw blade designed in this way, wherein the saw blade in the region of the tooth gullets following directly upon one another are bevelled alternatingly to the left and to the right, has surprisingly turned out not to require any setting or swaging of the teeth in order to run freely in the kerf that is being established. The sawing is extremely easy to perform, without noticeable vibration, and very silent and gives cuts with good surface smoothness when sawing in for example wood, plastics, and metal. Without binding the invention to any specific theory, it can be assumed that the saw blade combines the planing operation of the teeth with the operation of tools which cut like knives.

Especially favourable results have been achieved when forming each tooth face F1, F2 slightly concave. The hook angle a should preferably not exceed 15°, such that the strength of the teeth of the band saw blade is kept within acceptable limits. On the other hand the hook angle a should not be less than 1° in order to provide for a desired milling action. Preferably the hook angle is between 2–10°, more preferred about 3–8°. Moreover the tooth face F1, F2 should be angled in relation to the extension of the band saw blade to form an angle f1 which also is less than 15° but at least 1°, preferably 2–10°, more preferred about 3–8°. Also the bevelled surface S1 may be angled at about the same amount, i.e. β is less than 15°, but more than 1°, preferably 2–10° and more preferred about 3–8°. Finally the same relation may be desirable in relation to the extension of the tooth edges E1, E2 being alternately angled in relation to horisontal plane along the band saw blade, i.e. forming an angle γ which is less than 15° but more than 1°, preferably 2–10°, more preferred about 3–8°. Finally it has been noted that the structural strength of the band saw blade according to the invention may be further improved if the tooth back H1, H2 is formed slightly convex.

Successful experiments have been performed with saw blades designed in the above described manner, through sawing in fresh victuals, such as meat and fish etc, and in plastic, wood and comparatively soft metals, such as brass, wherein the saw blade consisted of a conventional, hardened carbon steel. It can be assumed that the same good results can be achieved also when sawing in harder materials, such as steel and other hard metals, if at least the saw teeth, or those parts thereof which are subjected to wear, consist of more qualified materials than hardened carbon steel, such as high speed steel, Stellite or cemented carbide.

In view of the successful experiments that have been performed with a saw blade designed in the above described way, one can also conceive that substantial improvements in comparison with prior art saw blades can be achieved also when the bevelled region has a smaller extension than what has been described above. It is, however, the opinion of the inventors that the bevelled region shall extend from the tooth edge of the first tooth point in the rear end of the first tooth gullet, down the tooth face and to at least the tooth bottom. Generally speaking, it can therefore be stated that the said region shall be bordered to the right by a first line which extends from a rear foot point defined by the right hand tooth corner of the first tooth edge or by a point on the first tooth edge, which point is nearer the right hand tooth corner than the left one, to a front foot point which borders on the left hand side of the saw blade in the region of the first tooth gullet or is a point on the tooth edge on the next tooth in front of said first tooth, to the left by the border line against the left planar side of the saw blade, and forwards by said first line and/or by the tooth edge of said next tooth when the front foot point of said first line lies on said next tooth edge; that the saw blade, within a region of a second tooth gullet between a second tooth and a next tooth in front of said second tooth is bevelled in the same way as in the first tooth gullet but instead to the right, and that the saw blade within the region of first and second tooth gullets between first or second teeth, on one hand, and teeth in front thereof, on the other hand, along the length of the saw blade, are bevelled in the said way alternatingly to the left and to the right in said first and second tooth gullets.

Probably, best results are achieved if all teeth and tooth gullets are designed according to the invention, wherein the material in the region of tooth gullets following consecutively directly after one another are bevelled alternatingly to the left and to the right. The invention, however, also can conceive that the saw blade within two or more tooth gullets following subsequently after each other is bevelled to the left, followed by a number of tooth gullets in which the saw blade is bevelled to the right and so on, repeatedly, although the inventors do not consider that that gives any significantly favourable effect.

The successful experiments with saw blades according to the invention have been performed with band saw blades.

Further characteristic features and aspects of the invention will be apparent from the appending claims and from the following description of the successfully tested embodiment and some other, conceivable embodiments.

BRIEF DESCRIPTION OF DRAWINGS

In the following description, reference will be made to the accompanying drawings, in which:

FIG. 2C is from the side, and from above, respectively.

Figure 1A:
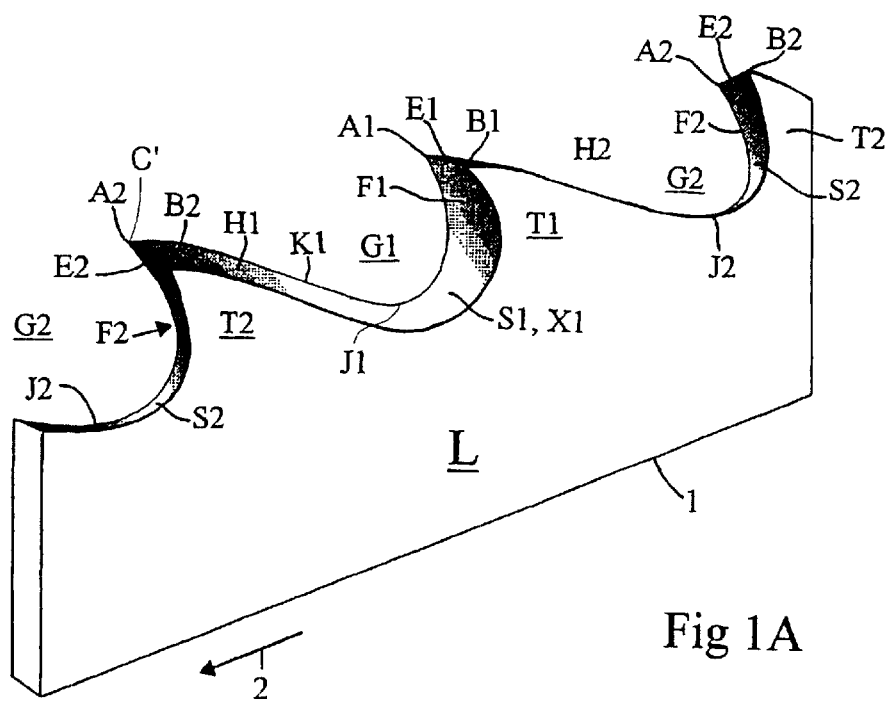
FIGS. 1A, 1B, show a section of a band saw blade according to the first preferred, and FIGS. 1C and 1D tested embodiment in a perspective view, from the side, in a vertical cross-section view and in a horisontal cross-section view, respectively.

In the drawings, the saw blade has been shown with strongly exaggerated thickness.

DESCRIPTION OF EMBODIMENTS

Figure 1B:
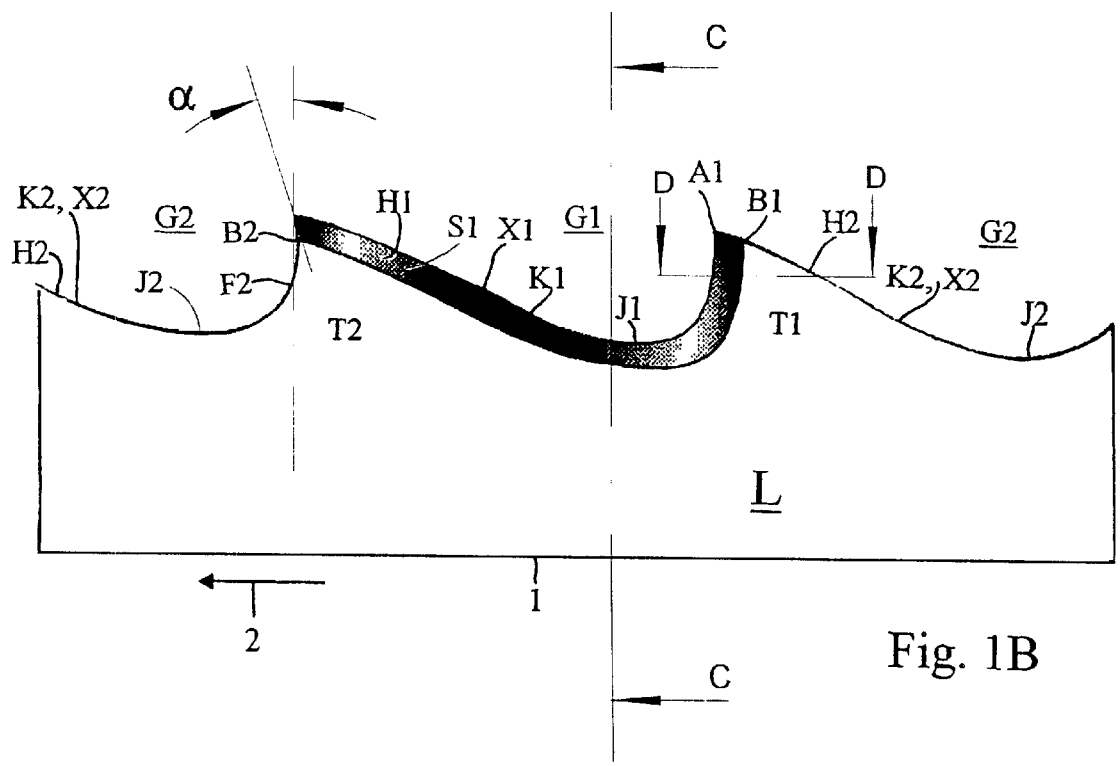

With reference first to FIGS. 1A and 1B, there is shown a section of a band saw blade 1 according to an embodiment which, when sawing in wood, plastics, fresh victuals and in comparatively soft metals, such as brass, has turned out to give very good results, as has been mentioned in the foregoing. The sawing direction is shown by an arrow 2. The blade thickness (gauge) is strongly exaggerated. A first tooth is designated T1 and second teeth on each side of the first tooth have been designated T2. The tooth edges at the tip of the tooth points of the teeth T1 and T2 have been designated E1 and E2, respectively. The tooth edge E1 on the first tooth T1 extends over the saw blade 1 between a right hand tooth corner A1 and a left hand tooth corner B1, while the tooth edges E2 extend between a right hand tooth corner A2 and a left hand tooth corner B2. The right planar side of the blade 1, which is hidden in FIGS. 1A and 1B, is denoted R, while the opposite, left hand planar side, turned towards the viewer, is designated L. A first tooth gullet between the tooth edge A1 and the tooth edge A2 in front thereof has been designated G1, while the tooth gullets in front of and at the rear of said tooth gullet G1 have been designated G2. A tooth face on the first tooth T1 in the tooth gullet G1 is designated F1. A tooth back on the tooth T2 in front thereof in the tooth gullet G1 is designated H1, while the tooth bottom in tooth gullet G1 is designated J1. Corresponding details in the tooth gullets G2 are designated F2, H2, and J2, respectively. The tooth face F1 is concave and it first extends downwards-rearwards from the edge E1, forming a hook angle $\alpha$ of approximately 5° (see FIG. 1B) whereafter it turns forwards towards the tooth bottom J1. The tooth back H1 extends convexly upwards from the tooth bottom J1 towards the tooth edge E2 on the tooth T2 in front thereof.

According to the embodiment shown in FIGS. 1A–1D, the saw blade is bevelled in the region of the entire tooth gullet G1 in such a mode that the bevelled saw blade surface S1 will slope towards the left hand side L of the saw blade forming an angle $\beta$ of about 5° (see FIG. 1C) with said left side, which means that the bevelled region with said sloping surface S1 will extend from the first tooth edge E1 in the rear end of the first tooth gullet G1, down the tooth face F1 and up the tooth back H1 all the way to the tooth edge E2 on the next tooth T2 in front of the first tooth. The bevelled region S1 is bordered to the right by a first line K1, which extends from the right hand tooth corner A1 of the tooth T1 to the right hand tooth corner A2 on the next tooth T2 in front of the first tooth T1. The line K1 coincides with the plane of the right hand planar side R of the blade and forms an edge line of a first longitudinal edge X1, the edge angle $\beta$ (see FIG. 1C) of which according the embodiment is about 5°. The said first longitudinal edge X1 thus has the shape of a longitudinal knife edge in the region of the entire tooth gullet G1 with an edge line K1, which follows the profile of the tooth gullet. The bevelled first region S1, which forms one side of the knife edge X1, is bordered to the left by the border line against the left hand side L of the blade, while the second knife edge side coincides with the plane of the right hand side R of the saw bade.

The saw blade 1 is bevelled in the same mode in the second tooth gullets G2, i.e. in front of and at the rear of the tooth gullet G1 but with the bevelled saw blade surfaces S2 instead sloping with the same amount, i.e. about 5°, to the right. The longitudinal tooth edges in the region of said second tooth gullets G2 are referred to as second tooth edges and have been denoted X2.

The blade 1, along its entire length, is provided with first teeth T1 alternating with second teeth T2 in front of and at the rear of the first teeth T1 and with said first bevelled surfaces S1 sloping to the left and second bevelled surfaces S2 sloping to the right, as has been shown and described with reference to the illustrated section. The blade 1 and the teeth T1 and T2 are unset and unswaged, which implies that the tooth corners A1 and A2 and the edge lines K1 of the first longitudinal knife edges X1 will coincide with the plane of the right hand side R of the saw blade 1, and that the edge lines K2 of said second, longitudinal knife edges with their edge lines K1 will coincide with the plane of the left hand side L of the blade.

FIG. 1C is showing a cross-sectional vertical view along the imaginary line C—C. As can be seen in FIG. 1C the tooth edge E2 will not be horizontal but sloping forming an angle $\gamma$ which is about 5°. Accordingly the left hand tooth corner B2 of the second tooth edge E2 will be positioned at a higher level than the right hand tooth corner A2. However, the right hand tooth corner A1 of the next tooth will be positioned at the same level as the left hand corner B2 of the tooth in front of it. Hence there is formed a kind of V-shaped pattern when viewing in the direction of the saw blade of a vertical cross-sectional view.

In FIG. 1D, which is a cross-sectional view along the horizontal line D—D, it can bee seen that each horizontal line of the tooth face F1 will form an angle f1 in relation to a perpendicular line through the saw blade. In the same manner a horizontal line of the tooth back H2 belonging to the same tooth T1 will form an angle f2 in relation to perpendicular plane through the saw blade, but in the opposite direction. Accordingly the form of the cross-section is frusta conical. The angles f1 and f2 are the same according to the preferred embodiment, i.e. about 5°. The tooth edge E1 will accordingly have a rake angle which is the same as the angle f1 of the tooth face F1.

Figure 2A:
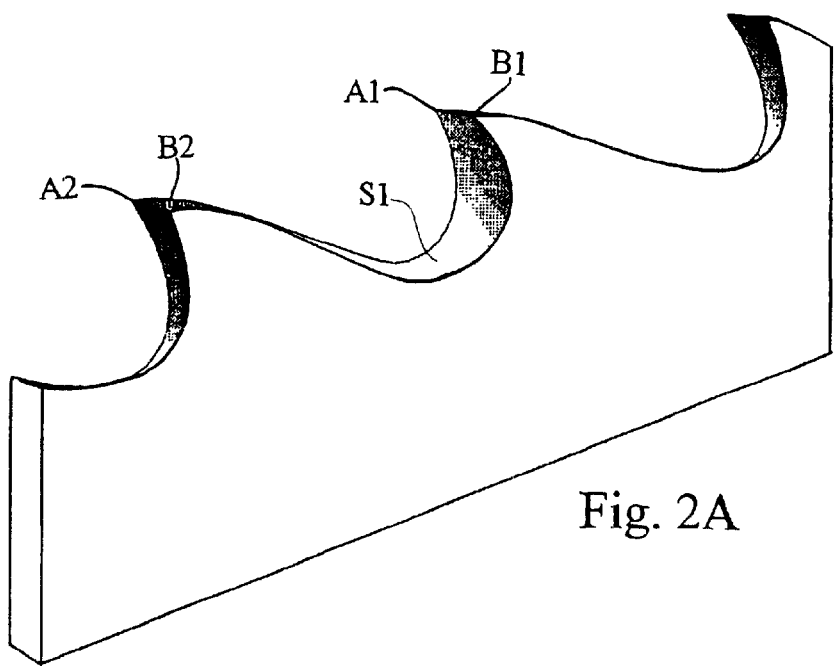
FIGS. 2A, 2B, illustrate a second, conceivable embodiment in a perspective view.
Figure 2B:
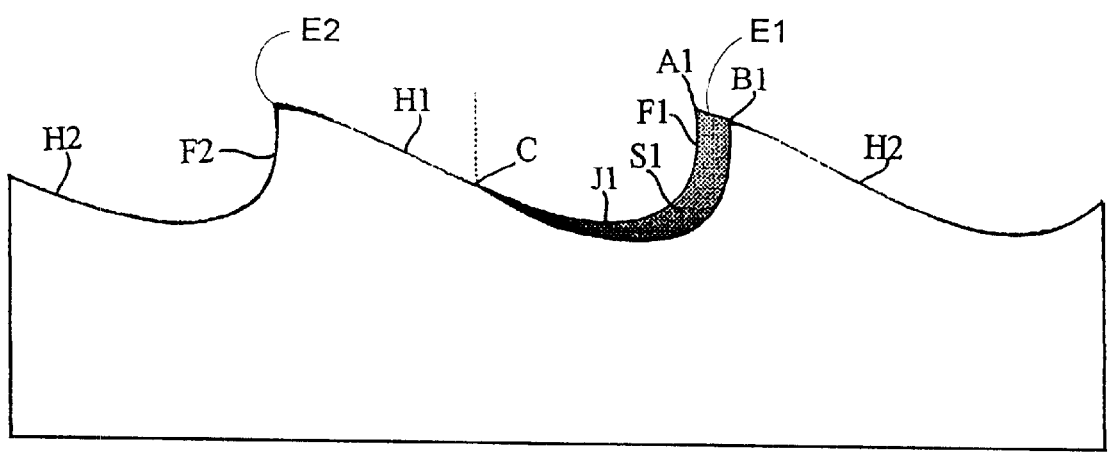

In the embodiments according to FIGS. 2A–2C and according to FIGS. 3A–3B the tooth and tooth gullet profiles have the same general shape as in FIGS. 1A and 1B, but the bevelled saw blade surfaces S1, S2 have a smaller extension than according to the embodiment that has been described with reference to FIGS. 1A and 1B. In FIGS. 2A–2C a bevelled saw blade surface in the first tooth gullet G1 has been designated S1 as above. This surface S1 is bordered at the rear by the tooth edge E1 of the first tooth T1 and to the left by the left hand saw blade surface L. To the right and forwards it is bordered by the first line K1, which in this case extends from the right hand tooth corner A1 on the tooth edge E1 to a foot point C, which borders on the right hand side of the saw blade in the region of the first tooth gullet G1 at a distance ahead of the tooth bottom J1, more particularly in the start region of the tooth back H1 of the next tooth T2 in front of the first tooth. The bevelled surface S1 (which is shaded in FIG. 2C), according to this embodiment, thus extends from the tooth edge E1 beyond the tooth bottom J1 and a distance up the tooth back H1 (the non shaded surface in FIG. 2C of the tooth back is not bevelled). In the region of the second tooth gullets G2, the blade is bevelled in the corresponding mode but instead sloping to the right according to the same principle that has been described with reference to the preferred embodiment.

Figure 3A:
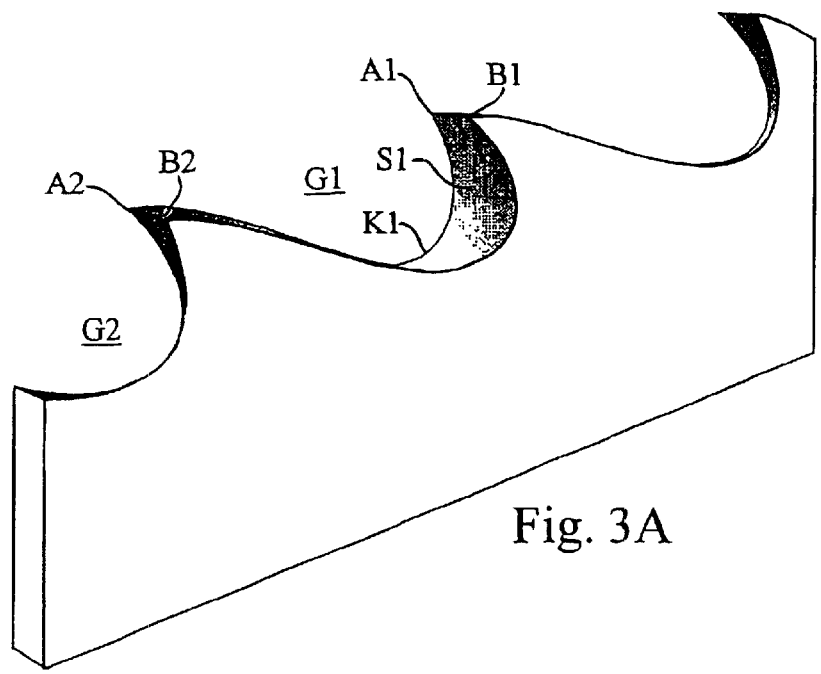
FIGS. 3A and 3B show a third, conceivable embodiment in a perspective view and from the side.
Figure 3B:
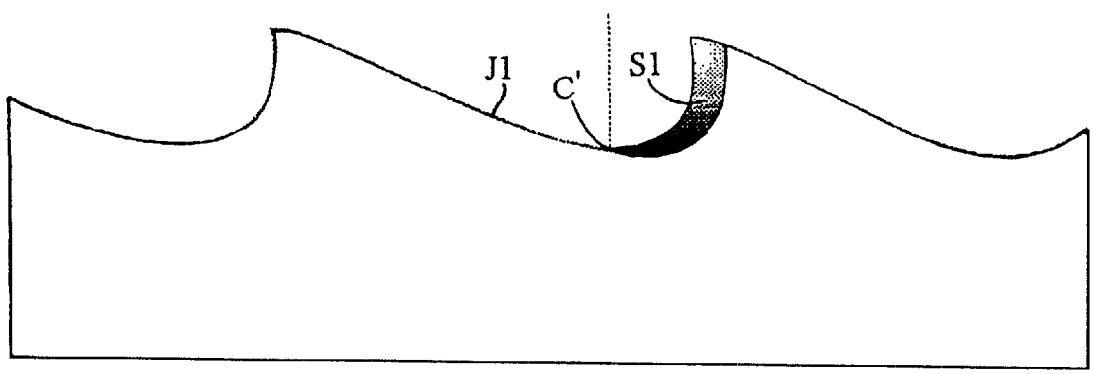

In the embodiment according to FIGS. 3A and 3B, the bevelled surfaces S1 and S2 have been given a still smaller extension, comprising only the tooth face F1 and F2, respectively, wherein said first line K1 extends from the right hand tooth corner A1 to a foot point C' in the tooth bottom J1. Also in this case, every second tooth gullet is designed with the bevelled surface S1 sloping to the left and every second tooth gullet G2 designed with the bevelled surface S2 sloping to the right, i.e. mirror-invertedly with reference to the sloping bevelled surface S1, as is analogously shown in FIG. 2C for the second embodiment.

According to a preferred mode of production the gullets are first formed by means of punching. Preferably the punches are move along the angles that are desired in relation to the produced surfaces such that the desired angle of each surface (e.g. the tooth face, the tooth back) and edge (e.g. each tooth edge) is formed during punching.

We claim:

1. A band saw blade with teeth having a tooth point with a tooth edge (E1, E2), a tooth face on a front side of the tooth as viewed in a direction of sawing, a tooth back behind the tooth edge, and a tooth bottom between the tooth face on each tooth and the tooth back on a next tooth in front of said each tooth, and tooth gullets, wherein a tooth gullet (G1, G2) is defined as a space between the tooth edges of two adjacent teeth, said saw blade having two planar sides; a right hand side (R) and a left hand side (L) when the saw blade is viewed obliquely from above in the direction of sawing, wherein said tooth edge (E1, E2) extends between a right hand tooth corner (A1, A2) and a left hand tooth corner (B1, B2) with reference to said viewing direction, comprising the saw blade within a region of a first tooth gullet between the tooth edge (E1) of a first tooth (T1) and the tooth edge (E2) of the next tooth (T2) in front of said first tooth is beveled such that a saw blade surface (S1) within said region slopes towards the left hand side (L) of the saw blade forming an angle (β) with said left hand side, a beveled region with a sloping surface (S1) extending from a first tooth edge (E1) in a rear end of the first tooth gullet to at least a beveled tooth bottom (J1), said region being bordered to the right by a first line (K1) which extends from a rear foot point defined by the right hand tooth corner (A1) on the first tooth edge (E1) to a front foot point (C) which borders on the right hand side of the saw blade in the region of the first tooth gullet, to the left of the border line against the left planar side (L) of the saw blade, and forwards by said first line and/or by the tooth edge (E2) of said next tooth (T2) when the front foot point of said first line lies on said next tooth edge; that the saw blade, within a region of a second tooth gullet (G2) between a second tooth and a next tooth in front of said second tooth is beveled in the same way as in the first tooth gullet but instead to the right, and that the saw blade within the region of first and second tooth gullets between first or second teeth, on one hand, and teeth in front thereof, on the other hand, along a length of the saw blade are beveled in a mode alternating to the left and to the right in said first and second tooth gullets, the first tooth (T1) having a left beveled region that is beveled from the right hand side (R) down to the left hand side (L), the left beveled region extending from the tooth edge (E1) down a tooth face (F1) across the beveled tooth bottom (J1) so that the angle (β) is formed relative to a horizontal plane (H).

2. A saw blade according to claim 1 wherein the top line of each tooth edge (E1, E2) is inclined in alternate directions in relation to each other, forming an angle (γ) in relation to a horizontal plane (H), said angle (γ) being between 1–15°, preferably 2–10°, more preferred about 3–8°.

3. A saw blade according to claim 1 wherein a hook angle (alpha) of each tooth is between 1–15°, more preferred 2–10°, and most preferred about 3–8°.

4. A saw blade according to claim 1 wherein each tooth face (F1, F2) forms an angle (f1) in relation to an imaginary, vertical perpendicular plane through the band saw blade, such that said angle (f1) is between 1–15°, preferably 2–10°, more preferred about 3–8°, and in an alternating direction consecutively along the band saw blade.

5. A saw blade according claim 4 wherein the longitudinal edge line (K1) in first tooth gullets (G1) of the saw blade lies in the same plane as the right hand side (R) of the saw blade, while the longitudinal edge (K2) in second tooth gullets (G2) of the saw blade lies in the same plane as the left hand side (L) of the saw blade.

6. A saw blade according to claim 1 wherein the tooth backs (H1, H2) in said first and second tooth gullets are convex, while the tooth faces (F1, F2) are concave, wherein the tooth edge (E1, E2) lies in front of a rearmost point of the concave tooth face.

7. A saw blade according to claim 1 wherein the angle (β) of the beveled saw blade surface in relation to a horizontal plane (H) is between 1° and 15°, preferably between 2° and 10°, and more preferred about 3–8°.

8. A saw blade according to claim 1 wherein said first and second teeth are unset and unswaged.

9. A saw blade according to claim 1 wherein the tooth corners of the tooth edges of said first and second teeth lies in the same plane as the sides of the saw blade.

10. A saw blade according to claim 8 wherein the blade is completely void of set or swaged teeth.

11. A saw blade according to claim 1 wherein said first and second teeth are provided alternating directly after each other, repeatedly along the length of the saw blade.

* * * * *